United States Patent
Philip et al.

(10) Patent No.: US 8,896,435 B2
(45) Date of Patent: Nov. 25, 2014

(54) SYSTEMS AND METHODS FOR AUTOMATED MONITORING WITH FLEXIBLE OPERATOR CONTROL

(71) Applicants: Thomas Philip, Waterloo (CA); Geoffrey Vanderkooy, Waterloo (CA)

(72) Inventors: Thomas Philip, Waterloo (CA); Geoffrey Vanderkooy, Waterloo (CA)

(*) Notice: Subject to any disclaimer, the term of this patent is extended or adjusted under 35 U.S.C. 154(b) by 81 days.

(21) Appl. No.: 13/853,117

(22) Filed: Mar. 29, 2013

(65) Prior Publication Data
US 2013/0293372 A1    Nov. 7, 2013

Related U.S. Application Data

(60) Provisional application No. 61/619,450, filed on Apr. 3, 2012.

(51) Int. Cl.
| | | |
|---|---|---|
| G08B 23/00 | (2006.01) | |
| G08B 27/00 | (2006.01) | |
| H04W 4/22 | (2009.01) | |
| H04L 29/06 | (2006.01) | |
| H04W 4/02 | (2009.01) | |
| G08B 25/00 | (2006.01) | |
| H04L 29/08 | (2006.01) | |

(52) U.S. Cl.
CPC ............ *G08B 27/00* (2013.01); *H04L 63/1408* (2013.01); *H04W 4/02* (2013.01); *G08B 25/005* (2013.01); *H04L 67/20* (2013.01); *H04W 4/22* (2013.01); *G08B 27/001* (2013.01)
USPC ............ 340/501; 340/502; 340/506; 340/5.2; 340/5.21

(58) Field of Classification Search
USPC ......... 340/501, 502, 506, 3.1, 5.8, 5.81, 5.85, 340/5.86, 5.1, 5.2, 5.21; 726/16, 19, 17, 2, 726/4, 21, 28
See application file for complete search history.

(56) References Cited

U.S. PATENT DOCUMENTS

| | | | | |
|---|---|---|---|---|
| 7,126,472 B2* | 10/2006 | Kraus et al. | ............... | 340/539.18 |
| 8,098,153 B2* | 1/2012 | Kraus et al. | ............... | 340/539.18 |

* cited by examiner

*Primary Examiner* — Toan N Pham

(57) ABSTRACT

A monitoring service is described that allows flexible response through operators taken from a group of chosen individuals. When an alarm state is triggered the chosen individuals may act collaboratively as operators to manage alarm conditions for a particular user.

14 Claims, 3 Drawing Sheets

System Diagram

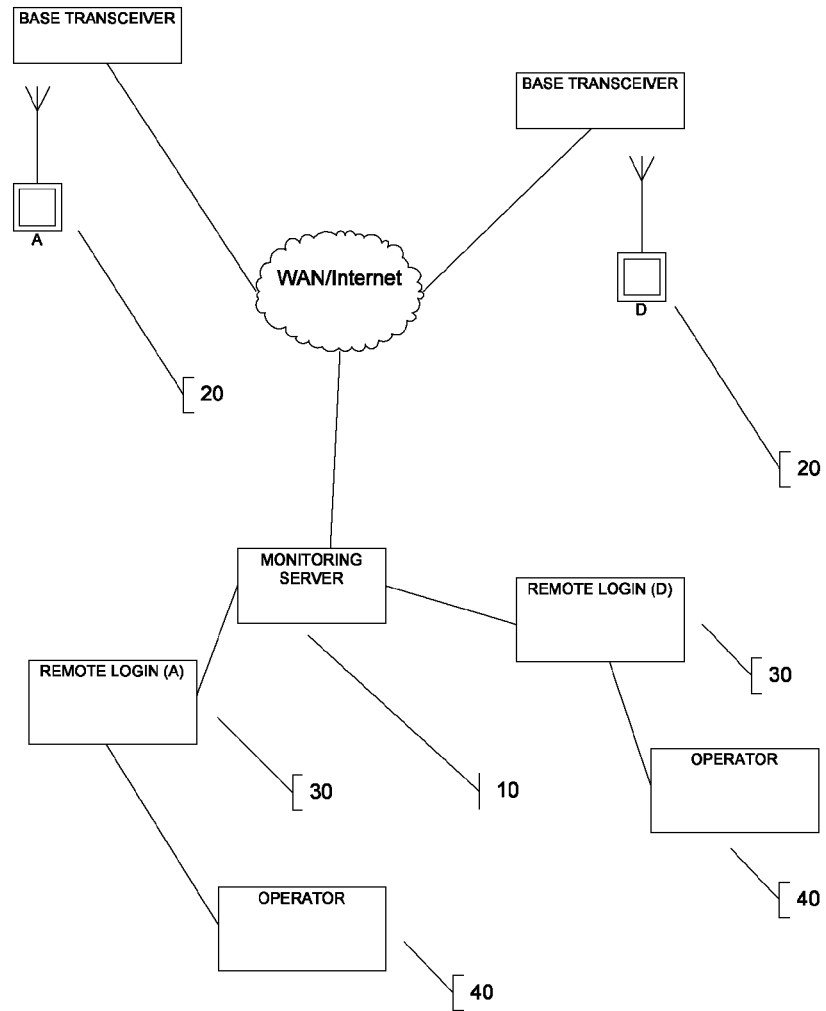
Figure 1: System Diagram

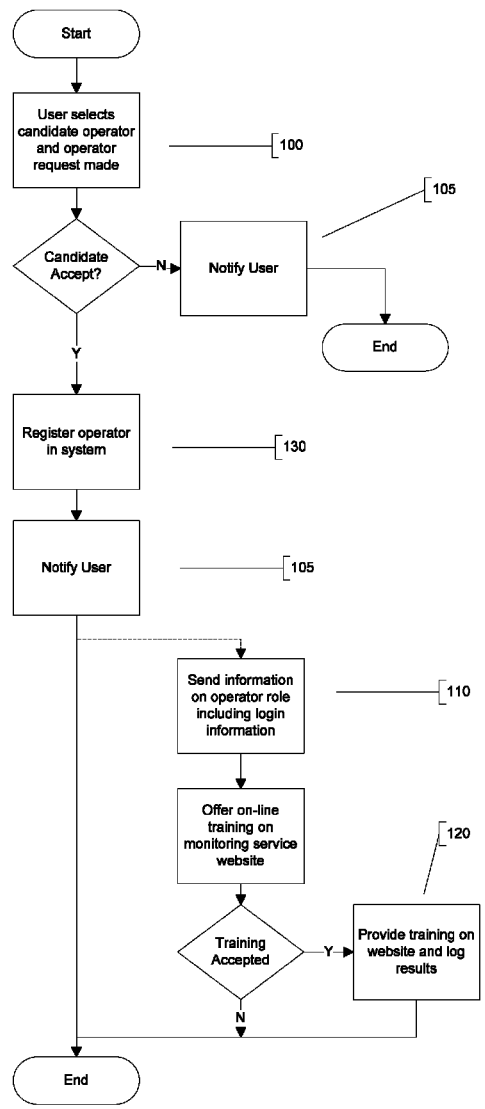
Figure 2: Optional Operator Registration

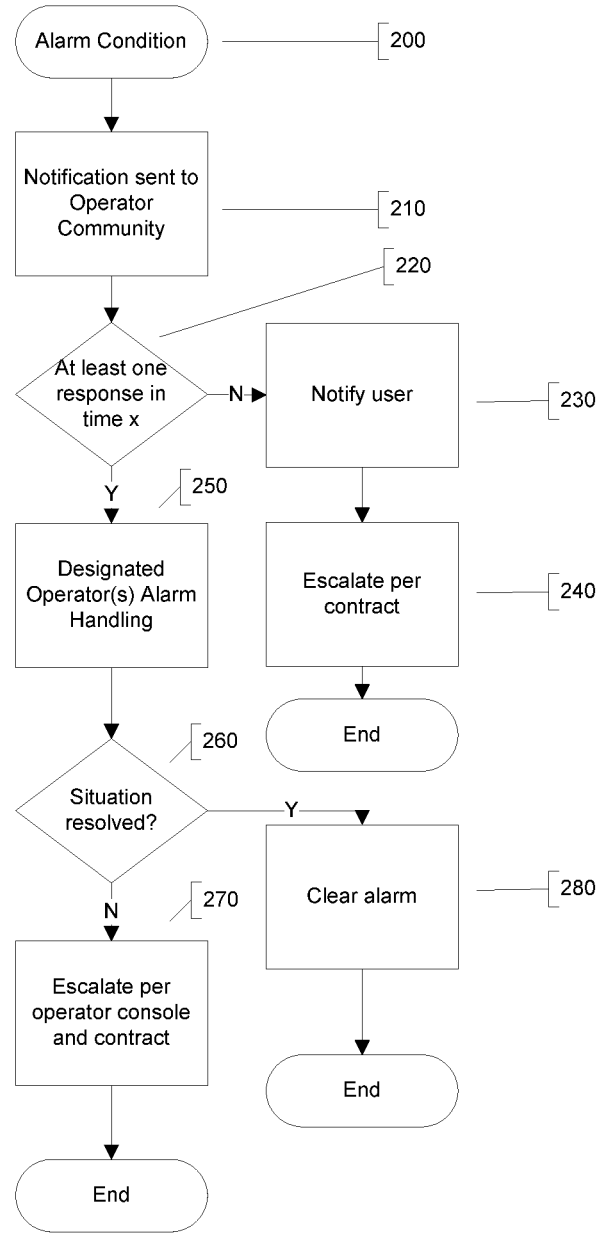
Figure 3 Use Case Scenario

SYSTEMS AND METHODS FOR AUTOMATED MONITORING WITH FLEXIBLE OPERATOR CONTROL

CROSS REFERENCE TO RELATED APPLICATION

PPA 61/619,450

SPECIFICATION

Field of the Invention

The present invention generally relates to remotely monitored systems, and more particularly, to a computerized system that monitors portable remote units with RF or other electromagnetic connectivity and is connected to a central control and monitoring element that provides system level operations.

BACKGROUND

Both private and public monitoring services exist. These systems do provide a useful service but suffer from significant infrastructure costs. Alternatively, ad hoc solutions for monitoring such as messaging friends and/or acquaintances when in real or perceived danger may be used but this technique suffers from a significant probability of failure when needed due to its manual nature.

A number of prior art systems have been proposed for security systems with monitoring services. For example, U.S. Pat. Nos. 7,126,472 and 8,098,153 describe a method of providing emergency response to a user carrying a mobile device by routing alarm conditions to a contact identified in a database. However, those disclosures suffer from deficiencies including prioritization of contacts, a mechanism to escalate to third parties, allowing access to a full-functionality full-time operator type console, and a mechanism to collaborate amongst contacts.

SUMMARY OF THE INVENTION

This invention provides flexible provision of operators for a monitoring system. These systems typically have one or more control centers that communicate with a plurality of remote terminals. The systems operate semi-autonomously with only occasional but required human supervision and control based on alarm status or other atypical conditions. Typically these systems will escalate an alarm or abnormal event to a human monitoring station operator. This disclosure enhances this topology with the flexible allocation of the operator function to chosen third party(s) as required. This capability facilitates custom monitoring operations and affords the opportunity of reduced cost structures since a dedicated operator is not mandatory.

BRIEF DESCRIPTION OF THE DRAWINGS

FIG. 1 is a block diagram of the invention describing one embodiment of the system topology FIG. 2 provides a flowchart of operator authorization FIG. 3 describes a typical embodiment of an intervention including optional escalations.

DETAILED DESCRIPTION OF THE INVENTION

Referring to FIG. 1, the system consists of one or more monitoring server(s) 10 connected to a plurality of portable remote units 20, by direct or networked radio interfaces. Examples of radio interfaces would include, but not be limited to, cellular, PCS, WiFi, and WiMax. The portable remote units 20 will provide their status to the control and monitoring server(s) 10. The monitoring server 10 will continuously make a determination of alarm conditions. Depending on system parameters an alarm indication may be handled autonomously by the system and/or the situation may be escalated to an operator for human intervention. This disclosure introduces to the state of the art the option of having the operator role 40 relayed to one or more chosen individual(s) for further action as opposed to a dedicated trained individual waiting for events. An operator 40 for a particular user gains access to the system through a secure login process 30. Said ioperators will be notified of an event that requires intervention. More than one chosen individual may service a particular user as an operator.

For this disclosure, a chosen individual is defined as a person that has been authorized to act as an operator 40 for the monitoring system. At least one chosen individual and, optionally, a plurality of chosen individuals may be designated as an operator by the user of the system. FIG. 2 describes a typical flow chart to optionally register a particular individual as an operator. The user makes a selection of an individual as a candidate operator and said individual is contacted and invited to be an operator 100. That contact is typically, though not exclusively, through electronic means such as e-mail, text messaging, or social networking. To facilitate the interaction, an overview of the operator role may also be sent with the invitation. If the candidate operator accepts the invitation, he/she will be registered with the system as an operator for the selected user and will be authorized to act as such 130. The user is then informed of the decision of said candidate operator on participating as an operator 105. Information is optionally sent to the new operator 110 and, as an additional option, monitoring server 10 login information may also be sent to said new operator. After the operator first logs in to the server with the supplied credentials the operator has the option to receive training on the system, including but not limited to typical use scenarios 120. A log of that training may be held by the system for possible use in prioritization algorithms. The user may optionally designate classes of operator to allow a hierarchy of operators for prioritization of actions. FIG. 2 describes the registration process for an operator for a particular user. It is possible that an individual may be an operator for a plurality of users. An operator would have the option to opt out of the operator role at any time for any reason.

Referring to FIG. 3, a typical use case scenario is described to illustrate core and optional elements of the disclosure. An alarm condition 200 triggers a notification to be sent to the set of individuals designated as operators 210. The notification would be sent electronically, typically but not exclusively as an e-mail or text message with a link to the monitoring server or as an alert to connect to the server. Said notification may be repeatedly sent to the operator community to improve the likelihood of a positive response. At the time of the notification a timer would be started by the server application that would be reset by the response of at least one operator 220. If the timer expires, an escalation procedure would be initiated by the server that could notify the user that no operator has responded and that the planned next steps by the server are being initiated 230. The consequences of said escalation 240 would be dependent on the service level of the user's contract or previous choice(s) of the user and may include notifying emergency services organizations with details of the situation as known by the server 10, or forwarding to a paid monitoring service. If at least one operator responds to the notification the operator alarm handling state would be entered 250.

The first operator to respond would be given operator control of the situation by the server 10. The operator would typically be able to monitor the state of the user based on information available on or through the Monitoring Server 10, including but not limited to location, biometrics, audio, video, and other sensors, optionally communicate with the user 20, and also escalate the situation to a paid monitoring service or government emergency services. If a plurality of operators respond all responding operators would typically have visibility to the other operators that have responded and, optionally, those operators that have not responded. At that point options would be available to have operators with higher authorization or aptitude take control. The protocol for control can be based on a number of parameters including pre-selection of authorization levels by the user, mutual agreement (allow handoff of control), first respondent leads, or other means. If there is a plurality of responding operators the system can provide the means to collaborate amongst the operators, including chat and other methods that may or may not include the user. An operator that is logged on may have the option to invite other operators, that may be known to said operator, to join the monitoring session by separate login.

As an outcome of the operator intervention 250, a decision is made by the operator(s) 260 on the state of the alarm. If the dangerous situation still exists an escalation state may be entered 270 which would typically involve emergency services such as 911 or local security. Conversely, if the dangerous situation is resolved the operator may clear the alarm 280.

For every alarm condition the monitoring server shall log the events for subsequent analysis.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

The advantages of the present invention include, without limitation, the opportunity to provide monitoring services by a plurality of individuals with more detailed knowledge of the user and their situation than could be afforded by a generic monitoring service. The invention also affords the opportunity of a community based collaborative solution with lower infrastructure and monitoring costs.

We claim:

1. A monitoring and response system comprising:
   a) at least one monitoring server with operator function;
   b) at least one remote login to operator function under control of a pre-identified operator in communication with the monitoring server;
   c) at least one base transceiver in communication with the monitoring server;
   d) at least one remote unit in communication with a base transceiver;
   e) a means to alert at least one third party of an option to use said operator function when an alarm condition has been triggered whereby any of a set of pre-identified responders can utilize the operator function on the monitoring server and respond to the alarm condition, without necessarily having a standing operator, allowing significant flexibility in response and reduction of standing cost.

2. The system of claim 1 further comprising a means to inform an individual that they are a valid operator for a particular user of the system whereby the operator has an opportunity to be informed of their potential future involvement with the system and learn of an associated functionality.

3. The system of claim 1 further comprising a means to offer training to an operator whereby said operator is informed of the capabilities of said operating system and is able to try a demonstration version of said system to be better prepared for future usage of said system.

4. The system of claim 2 further comprising a means to register an individual as a valid operator for a particular user whereby a candidate operator has an opportunity to be informed of their potential future involvement with said system, and an opportunity to agree or refuse to participate as an operator with feedback to said particular user.

5. The system of claim 1 further comprising a means to prioritize which of responding operators is in control of the operator function whereby there is clear control and action by a single operator avoiding confusion when there is a plurality of operators responding.

6. The system of claim 1 further comprising a means to escalate or handoff an alarm handling of a particular responding operator to any other available operator for a user whereby said responding operator is provided the opportunity to pass the operator duties to an available operator when a more qualified or higher priority operator is available or when said responding operator must end their involvement.

7. The system of claim 6 in which said available operator could include a standing operator at a regular monitoring station or an EMS system.

8. The system of claim 1 further comprising a means for a plurality of operators to co-operate in their response to the alarm condition whereby said plurality of operators can collaborate or share tasks allowing for more effective or faster response.

9. A method of providing flexible emergency response to a user comprising the steps of:
   a) identification by the user of a set of trusted individuals that could act as operators;
   b) registration of each of said trusted individuals as an operator if said operator accepts;
   c) notification of the operator(s) that an intervention response for the user is requested due to an alarm condition;
   d) transfer of intervention response control to a first responding operator for further action.

10. A method as set forth in claim 9 where the user may optionally prioritize a list of operators to allow escalation of the response control to a most highly prioritized responding operator.

11. A method as set forth in claim 9 where information on the user, including but not limited to audio, video, location, and biometric information, is transmitted to the operators for use in choosing a course of action.

12. A method as set forth in claim 9 where responding operators are given visibility of other responding operators and, optionally, of non-responding operators.

13. A method as set forth in claim 9 where responding operators are given an option of deciding to escalate a situation to EMS or other services or visibility of other responding operators or to clear the alarm condition.

14. A method as set forth in claim 9 where an interaction between the user and the operator(s) is logged during an alarm state situation.

* * * * *